United States Patent
Yamamoto et al.

(10) Patent No.: US 7,164,639 B2
(45) Date of Patent: Jan. 16, 2007

(54) TILT CONTROL FOR OPTICAL DISC RECORDING AND PLAYBACK APPARATUS

(75) Inventors: Tsuyoshi Yamamoto, Ota (JP); Koji Tsukagoshi, Fukaya (JP); Hideki Osawa, Fukaya (JP); Hiroyuki Mutou, Ora-Gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 489 days.

(21) Appl. No.: 10/615,996

(22) Filed: Jul. 8, 2003

(65) Prior Publication Data

US 2004/0042355 A1    Mar. 4, 2004

(30) Foreign Application Priority Data

Aug. 30, 2002 (JP) ............................. 2002-253982
Sep. 4, 2002 (JP) ............................. 2002-258788

(51) Int. Cl.
*G11B 7/095* (2006.01)
(52) U.S. Cl. ................................. 369/53.19; 369/44.32
(58) Field of Classification Search .................. None
See application file for complete search history.

(56) References Cited

U.S. PATENT DOCUMENTS 4,730,294 A * 3/1988 Funada .................... 369/44.26
6,842,414 B1 * 1/2005 Park ........................ 369/53.19

FOREIGN PATENT DOCUMENTS

JP    2002-197698    7/2002
JP    2002-208155    7/2002

\* cited by examiner

*Primary Examiner*—William Korluch
*Assistant Examiner*—Joseph Haley
(74) *Attorney, Agent, or Firm*—Hogan & Hartson LLP

(57) ABSTRACT

A DC voltage value is obtained at least at an inside position, an intermediate position, and an outside position on a disc (1) from a drive signal that is supplied to a focusing coil (4) built into an optical pickup (2). From the DC voltage values is obtained a relationship of a position between the respective positions and the DC voltage value, and this relationship is stored into a memory circuit (12). Then, during recording or playback, the DC voltage value that is calculated on the basis of the recording or playback position of the signal at that time and the AC signal included in the drive signal that is supplied to the focusing coil (4) are added to create a signal to be supplied to a tilt adjustment coil (6).

10 Claims, 3 Drawing Sheets

TILT CONTROL FOR OPTICAL DISC RECORDING AND PLAYBACK APPARATUS

BACKGROUND OF THE INVENTION

1. Field of the Invention

The present invention relates to an optical disc recording and playback apparatus that is configured so that a signal is recorded to disc by a laser emitted from an optical pickup and the signal recorded on the disc is played back by the laser.

2. Description of the Related Art

Disc players for reading signals that have been recorded on discs using optical pickups have become pervasive. Recently, in addition to the playback function, disc recording and playback apparatuses configured so as to enable signals to be recorded onto discs by a laser emitted from an optical pickup have become commercialized.

In an optical disc recording and playback apparatus, it is necessary to accurately aim the laser beam emitted from the optical pickup to a signal track on the disc surface for performing focus control and tracking control operations. The related focus control operation is performed by supplying driving current to a focusing coil for displacing an objective lens toward the disc surface, and the tracking control operation is performed by supplying driving current to a tracking coil for displacing the objective lens in a radial direction on the disc.

Recently, the trend has been to increase the signal density so as to record more signals onto a disc. To increase the density, it is necessary to optimally aim the laser beam onto the disc. To perform this operation, an operation for correcting the relative angle of deviation between the disc and the objective lens, namely, an optical pickup configured so as to allow a tilt adjustment, has been developed. (For example, refer to Japan Patent Laid-Open Publication No. 2002-197698.) Additionally, a technique for detecting the tilt of the pickup with respect to the disc and for adjusting the tilt has been developed. (For example, refer to Japan Patent Laid-Open Publication No. 2002-208155.)

SUMMARY OF THE INVENTION

An advantage of the present invention lies in effectively performing tilt control of the optical pickup.

According to the present invention, the relationship between the access position of the optical disc by the optical pickup and the DC component of the focusing drive signal of the optical pickup is stored in advance. Then, during the actual recording or playback, the DC component corresponding to the access position is read, and an AC component of the focusing drive signal at the time is added to generate a tilt drive signal. The tilt of the optical pickup is controlled on the basis of this tilt drive signal.

DETAILED DESCRIPTION OF THE PREFERRED EMBODIMENTS

Figure 1:
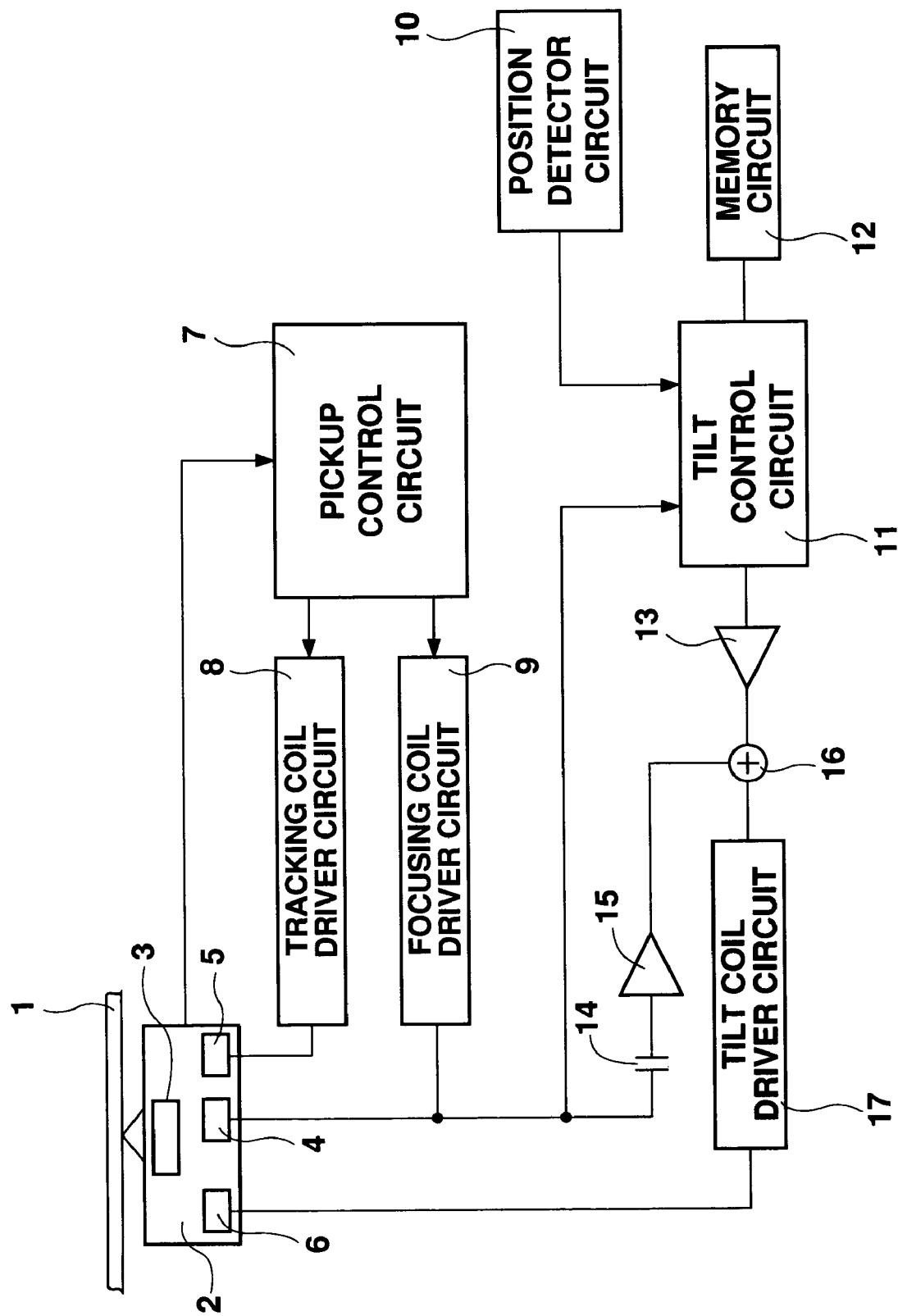
FIG. 1 is a block diagram showing an optical disc recording and playback apparatus relating to an embodiment of the present invention.
Figure 2:
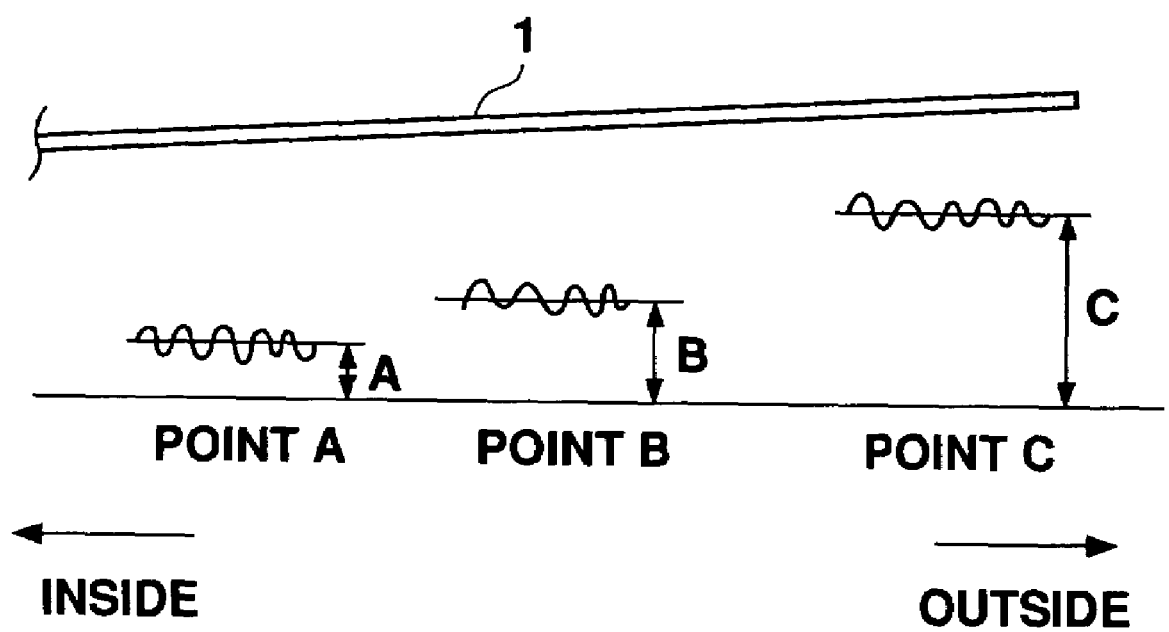
FIG. 2 illustrates an operation of the embodiment.

FIG. 1 is a block diagram showing an embodiment of the optical disc recording and playback apparatus relating to the present invention and FIG. 2 illustrates an operation of the present invention.

In FIG. 1, a disc 1, which is mounted on a turntable (not shown) that is rotationally driven by a spindle motor (not shown), is rotationally driven by the rotation of the turntable. Furthermore, positional information data is recorded along a pregroove on the disc 1, and the signal recording and playback operations are performed on the basis of the wobble signal obtained from this groove. An optical pickup 2 comprising a built-in laser diode for emitting a light beam onto the disc 1, a monitor diode for monitoring the light emitted from the laser diode, and a photo detector for receiving the light beam reflected from the signal surface of the disc 1, is configured so as to move in a radial direction on the disc 1 by a pickup feed motor (not shown).

Furthermore, the optical pickup 2 comprises a focusing coil 4 for displacing an objective lens 3 along the disc surface, a tracking coil 5 for displacing the objective lens 3 along the radial direction on the disc 1, and a tilt adjustment coil 6 for adjusting the angle of the objective lens 3 with respect to the disc 1.

A pickup control circuit 7 performs a focusing control operation for focusing the light beam from the optical pickup 2 on the signal surface of the disc 1 on the basis of the signal obtained from the photo detector that is built into the optical pickup 2 and a tracking control operation for tracking the light beam along a signal track on the signal surface, and is configured so as to output a tracking control signal on the basis of a tracking error signal and a focusing control signal on the basis of a focus error signal.

A tracking coil driver circuit 8 inputs the tracking control signal that is output from the pickup control circuit 7 and is configured so as to supply a drive signal to the tracking coil 5 that is built into the optical pickup 2. A focusing coil driver circuit 9 inputs the focusing control signal that is output from the pickup control circuit 7 and is configured so as to supply a drive signal to the focusing coil 4 that is built into the optical pickup 2.

FIG. 2 shows the drive signal that is supplied to the focusing coil 4 at point A, which is positioned at the inside of the disc 1, point B, which is an intermediate position, and point C, which is positioned at the outside, when the disc 1 is inclined with respect to the optical pickup 2, and superimposed with an AC signal to the respective DC voltages A, B, and C. The DC voltages A, B, and C function to displace the position of the objective lens corresponding to the positional relationship between the signal surface of the disc 1 and the optical pickup 2, and vary in accordance with the inclination of the disc 1. Furthermore, the AC signal that is superimposed onto the DC voltage functions to minutely displace the objective lens with respect to the signal surface of the disc 1 to correspond to surface fluctuations of the signal surface of the disc 1.

A position detector circuit 10 detects the position of the optical pickup 2 on the basis of the positional information data played back from the disc 1, a tilt control circuit 11 detects a DC voltage from the drive signal that is output from the focusing coil driver circuit 9 and performs a tilt control operation, and a memory circuit 12 has its operation controlled by the tilt control circuit 11.

In this configuration, the DC voltage A at point A, which is an inside position of the disc 1, the DC voltage B at point B, which is an intermediate position, and the DC voltage at point C, which is an outside position, are obtained to move the optical pickup 2 to their respective positions. Their values are stored in the memory circuit 12, and based on these values, the relationship of the DC voltage and the position between points A and B on the disc 1 and the relationship of the DC voltage and the position between points B and C are obtained. The tilt control circuit 11 is configured so as to output the DC voltage that is calculated on the basis of the relationship of the DC voltage and the position derived from DC voltage values A, B, and C that are stored in memory circuit 12.

An amplifier circuit 13 amplifies signals output from the tilt control circuit 11, a capacitor 14 blocks the DC signal from the drive signal that is output from the focusing coil driver circuit 9, and an amplifier circuit 15 inputs and amplifies the AC signal passing the capacitor 14. An adder circuit 16 adds the DC signal that was amplified by the amplifier circuit 13 and the AC signal that was amplified by the amplifier circuit 15. A tilt coil driver circuit 17 inputs the signal that was added by the adder circuit 16 and is connected so as to supply a drive signal to the tilt adjustment coil 6 that is built into the optical pickup 2.

The optical disc recording and playback apparatus relating to the present invention has been configured as described above and its operation will be described in the following.

The tilt adjustment operation starts by performing the focusing control operation in a state where the optical pickup 2 is positioned at point A on the inside of the disc 1. When this operation is performed, the focusing control signal is output from the pickup control circuit 7 to the focusing coil driver circuit 9 on the basis of the signal obtained from the photo detector 3 that is built into the optical pickup 2.

As a result, the drive signal shown in FIG. 2 from the focusing coil driver circuit 9, namely, the signal in which an AC signal is superimposed on the DC voltage A, is supplied to the focusing coil 4. The DC voltage A causes the objective lens 3 to be displaced to an optimum position with respect to the disc 1 for performing the focusing operation, and the AC signal causes the light beam to focus onto the signal surface of the disc 1, which fluctuates with the rotation of the disc 1.

The focusing control operation at point A on the inside of the disc 1 is performed as described above. In this state, the drive signal that is supplied from the focusing coil driver circuit 9 to the focusing coil 4 is input by the tilt control circuit 11. The tilt control circuit 11 then performs a control operation by detecting the value of the DC voltage A in the drive signal that is input and storing that value into the memory circuit 12.

When this operation is performed, an operation is next performed to move the optical pickup 2 to point B, which is an intermediate position on the disc 1. This movement operation can be performed by detecting with the position detector circuit 10 the positional information data recorded on the disc 1. When the optical pickup 2 is moved to point B, the aforementioned focusing control operation is performed. When the focusing control operation is performed, the focusing control signal is output from the pickup control circuit 7 to the focusing coil driver circuit 9 on the basis of the signal obtained from the photo detector 3 that is built into the optical pickup 2.

As a result, the drive signal shown in FIG. 2 from the focusing coil driver circuit 9, namely, the signal in which the AC signal is superimposed on the DC voltage B, is supplied to the focusing coil 4. The DC voltage B causes the objective lens 3 to be displaced to an optimum position with respect to the disc 1 for performing the focusing operation, and the AC signal causes the light beam to focus onto the signal surface of the disc 1, which fluctuates with the rotation of the disc 1.

The focusing control operation at point B at an intermediate position on the disc 1 is performed as described above. In this state, the drive signal that is supplied from the focusing coil driver circuit 9 to the focusing coil 4 is input by the tilt control circuit 11. The tilt control circuit 11 then performs a control operation by detecting the value of the DC voltage B in the drive signal that is input and storing that value into the memory circuit 12.

When this operation is performed, an operation is next performed to move the optical pickup 2 to point C, which is on the outside position of the disc 1. This movement operation can be performed by detecting with the position detector circuit 10 the positional information data recorded on the disc 1. When the optical pickup 2 is moved to point C, the aforementioned focusing control operation is performed. When the focusing control operation is performed, the focusing control signal is output from the pickup control circuit 7 to the focusing coil driver circuit 9 on the basis of the signal obtained from the photo detector 3 that is built into the optical pickup 2.

As a result, the drive signal shown in FIG. 2 from the focusing coil driver circuit 9, namely, the signal in which the AC signal is superimposed on the DC voltage C, is supplied to the focusing coil 4. The DC voltage C causes the objective lens 3 to be displaced to an optimum position with respect to the disc 1 for performing the focusing operation, and the AC signal causes the light beam to focus onto the signal surface of the disc 1, which fluctuates with the rotation of the disc 1.

The focusing control operation at point C on the outside position of the disc 1 is performed as described above. In this state, the drive signal that is supplied from the focusing coil driver circuit 9 to the focusing coil 4 is input by the tilt control circuit 11. The tilt control circuit 11 then performs a control operation by detecting the value of the DC voltage C in the drive signal that is input and storing that value into the memory circuit 12.

When the operation to detect the DC voltage A at the inside position, DC voltage B at an intermediate position, and DC voltage C at the outside position, and the storage operation to the memory circuit 12 are performed, the relationship of the DC voltage value and a position between points A and B on the disc 1 can be obtained from the relationship of the inside position and intermediate position and the difference of the DC voltage values A and B. Therefore, DC voltage values corresponding to respective positions between points A and B on the disc 1 are calculated so that a signal with the calculated DC voltage value can be output to the tilt control circuit 11. Similarly, a relationship between the DC voltage value and a position between points B and C on the disc 1 can be obtained from the relationship of the intermediate position and the outside position and the difference of the DC voltage values B and C. Therefore, DC voltage values corresponding to respective positions between points B and C on the disc 1 are calculated so that a signal with the calculated DC voltage value can be output to the tilt control circuit 11.

After being input by the amplifier circuit 13 and amplified, the DC signal that is output from the tilt control circuit 11 is input by the adder circuit 16. On the other hand, the drive signal that is output from the focusing coil driver circuit 9 is input through the capacitor 14 by the amplifier circuit 15. The signal that is input by the amplifier circuit 15 is an AC signal from which the DC signal has been blocked, namely, the signal for displacing the objective lens 3 with respect to surface fluctuations of the disc 1. The AC signal that has been amplified by the amplifier circuit 15 is input by the adder circuit 16 and added to the DC signal that has been amplified by the amplifier circuit 13, then input by the tilt coil driver circuit 17.

As a result, the signal in which the AC signal is superimposed on the DC signal corresponding to the respective position on the disc 1 is supplied from the tilt coil driver circuit 17 to the tilt adjustment coil 6 that is built into the optical pickup 2. Therefore, performing the tilt adjustment of the objective lens 3 by the tilt adjustment coil 6 makes it possible to control the optical pickup 2 at an optimum state with respect to the signal surface of the disc 1.

It should be noted that although the position detection operation by the position detector circuit 10 was performed using positional information data, it can also be performed using the number of revolutions of the motor moving the optical pickup 2. Furthermore, although the DC voltage of the drive signal supplied to the focusing coil 4 was detected at the inside position and the outside position, when the inside position is set to the innermost position on the disc 1 and outside position is set to the outermost position, the change in the value of the DC voltage representing the tilt of the disc 1 with respect to the optical pickup 2 becomes large so that the relationship between position and DC voltage can be easy to derive.

Furthermore, although it is possible to set the intermediate position to the middle of the innermost position and the outermost position on the disc 1, it is also possible to set it to a position shifted to the outside, which is a position that is easily influenced by tilt. Furthermore, although detection was performed at three positions according to the present embodiment, it is naturally possible to increase the number of positions where detection is to be performed, and in this case, the advantage is that precision is improved.

In the above-mentioned embodiment, the DC component of the focusing drive signal is detected at the three positions of inside position, intermediate position, and outside position, and based thereon is obtained the relationship between the objective lens position and the DC component of the focusing drive signal. However, at the inside position and the outside position, the DC component of the focusing drive signal is detected, and based thereon may be obtained the relationship between the objective lens 3 position and the DC component of the focusing drive signal.

Figure 3:
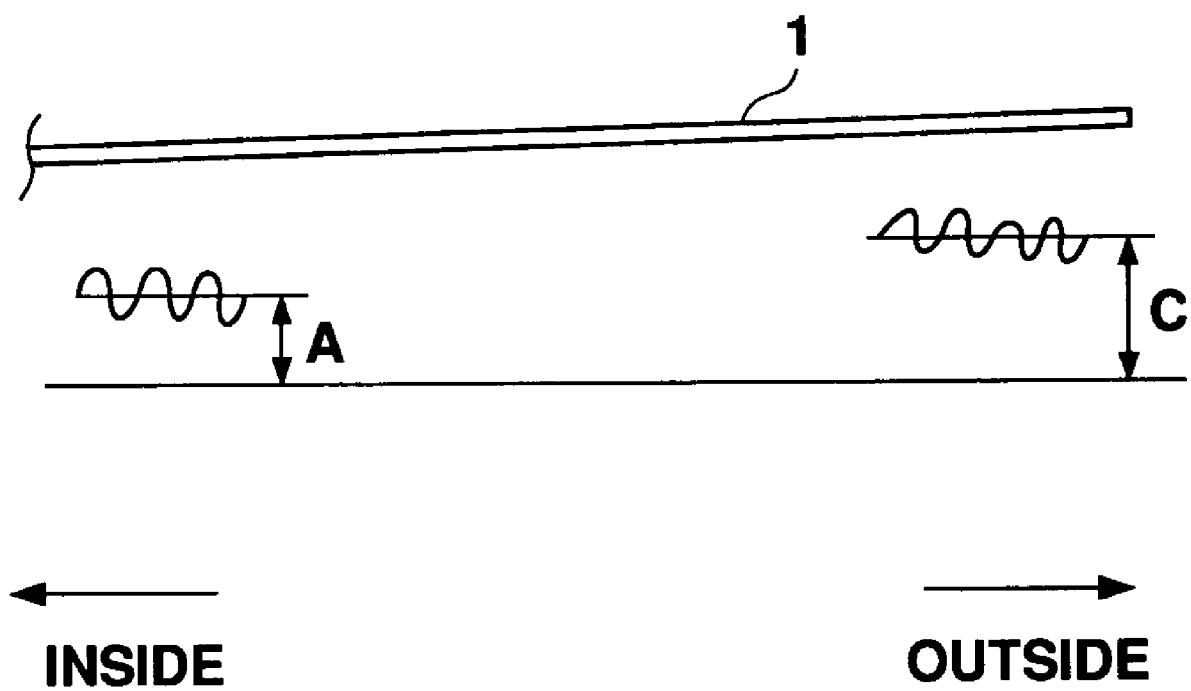
FIG. 3 illustrates an operation of another embodiment.

FIG. 3 shows the focusing drive signal that was detected at the two positions of inside and outside positions. The DC components A and B of the focusing drive signal can be detected at the inside position and outside position from the focusing drive signal. In the present embodiment, the relationship between the disc position and the DC component is obtained from the two DC components A and B and their disc positions, and stored.

In the case where the DC components at the two positions are obtained, it is preferable to obtain the relationship of the disc position and the DC component as a straight line connecting the two points. Furthermore, in the case of three or more positions, it is possible to approximate a straight line or a polynomial, such as by using a method of least squares and so forth.

When recording or playing back on a single disc, a playback operation is first performed at the aforementioned two or three positions, and the DC component at those instances is detected from the focusing drive signal. On the basis of the detected results, the relationship between the disc position and the DC component of the focusing drive signal is calculated and stored. Then, during recording or playback of this disc, this relationship is used to create the tilt control signal. This operation is performed each time a disc is mounted.

It should be noted that the DC component of the focusing drive signal can be easily extracted with a low-pass filter and subjected to A/D conversion. Furthermore, the AC component of the focusing drive signal can be extracted with a high-pass filter and subjected to A/D conversion.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A tilt control method for controlling the tilt, with respect to an optical disc, of an objective lens in an optical pickup for recording or playing back signals through the objective lens, comprising:
   a tilt control circuit for controlling the tilt of said objective lens by controlling the amount of current to a tilt adjustment coil; and
   a focusing control circuit for adjusting the focus of the objective lens by controlling the current to a focusing coil;
   a preprocessing procedure comprising the steps of:
   detecting, at least at two different positions along a radical direction on the optical disc during recording or playback of signals to or from said optical disc, a DC voltage value from a focusing drive signal that is supplied to said focusing coil; and
   obtaining from respective detected DC voltage values a relationship between a position on said optical disc where recording or playback is being performed and the DC voltage value of said focusing drive signal;
   actual recording or playback procedure comprising the steps of:
   detecting a recording or playback position to obtain a corresponding DC voltage value during recording or playback of signals to or from said optical disc; and
   controlling the amount of current that is supplied to said tilt adjustment coil on the basis of a signal in which the obtained DC voltage value is added to an AC signal included in the drive signal that is supplied to said focusing coil at the time.

2. A method according to claim 1, wherein:
   in said preprocessing procedure, at two positions of inside position and outside position on the optical disc, the DC voltage of the focusing drive signal is detected, and said relationship is obtained from the detected result.

3. A method according to claim 2, wherein:
   said inside position is the innermost position that can be recorded or played back on said optical disc, and said outside position is the outermost position that can be recorded or played back on said optical disc.

4. A method according to claim 1, wherein:
   in said preprocessing procedure, at three positions of inside position, outside position, and intermediate position on the optical disc, the DC voltage of the focusing drive signal is detected, and said relationship is obtained from the detected result.

5. A method according to claim 4, wherein:
   said inside position is the innermost position that can be recorded or played back on said optical disc, and said outside position is the outermost position that can be recorded or played back on said optical disc.

6. A method according to claim 1, wherein:
a recording or playback position of signals for said optical disc is detected on the basis of positional information that has been recorded on said optical disc.

7. A method according to claim 1, wherein:
a recording or playback position of signals for said optical disc is detected according to revolutions of the motor moving said optical pickup.

8. A control apparatus for an optical pickup for performing recording or playback of signals by emitting light onto an optical disc from an objective lens, comprising:
a tilt coil for adjusting the tilt of said objective lens;
a focusing coil for adjusting the focus of light from said objective lens;
a position detecting apparatus for detecting the recording or playback position along a radial direction with respect to said optical disc;
means for providing a DC voltage value corresponding to the detected recording or playback position;
a tracking coil driver circuit 8 inputs the tracking control signal that is output from the pickup control circuit 7 and is configured so as to supply a drive signal to the tracking coil 5 that is built into the optical pickup 2; a focusing coil driver circuit 9 inputs the focusing control signal that is output from the pickup control circuit 7 and is configured so as to supply a drive signal to the focusing coil 4 that is built into the optical pickup 2;
a relationship storage section for storing the relationship between the radial position detected by said position detecting apparatus and a DC component of said focusing drive signal, and outputting said DC component corresponding to the detected result of said position detecting apparatus;
an AC component extractor for extracting the AC component from the focusing drive signal for controlling the focus of the optical pickup; and
a tilt control circuit for adding said DC component that is output from said relationship storage section and said AC component that is output from said AC component extractor, and controlling the tilt of the optical pickup by controlling the current of said tilt coil on the basis of the obtained addition signal.

9. An apparatus according to claim 8, wherein:
a recording or playback position of signals for said optical disc is detected on the basis of positional information that has been recorded on said optical disc.

10. An apparatus according to claim 8, wherein:
a recording or playback position of signals for said optical disc is detected according to revolutions of the motor moving said optical pickup.

* * * * *